United States Patent
Denyer et al.

(10) Patent No.: US 6,493,029 B1
(45) Date of Patent: Dec. 10, 2002

(54) IMAGE RESTORATION METHOD AND ASSOCIATED APPARATUS

(75) Inventors: Peter Brian Denyer, Edinburgh (GB); Stewart Gresty Smith, Newbattle Terrace (GB)

(73) Assignee: VLSI Vision Limited, Edinburgh (GB)

( * ) Notice: Subject to any disclaimer, the term of this patent is extended or adjusted under 35 U.S.C. 154(b) by 0 days.

(21) Appl. No.: 09/101,378

(22) PCT Filed: Jun. 5, 1997

(86) PCT No.: PCT/GB97/00599
§ 371 (c)(1),
(2), (4) Date: Jul. 8, 1998

(87) PCT Pub. No.: WO97/35438
PCT Pub. Date: Sep. 25, 1997

(30) Foreign Application Priority Data

Mar. 15, 1996 (GB) ............................................. 9605527

(51) Int. Cl.[7] .............................. H04N 3/14; H04N 9/68
(52) U.S. Cl. ........................ 348/236; 348/237; 348/253; 348/280; 358/520
(58) Field of Search ................................. 358/518, 520, 358/524, 482, 483; 359/885, 891; 382/162, 167, 190, 195, 199, 205; 348/207, 222, 223, 224, 266, 272, 273, 277, 280, 234, 235, 236, 237, 238, 222.1

(56) References Cited

U.S. PATENT DOCUMENTS

| | | | |
|---|---|---|---|
| 3,971,065 A | 7/1976 | Bayer | 348/276 |
| 4,176,373 A | 11/1979 | Dillon et al. | 348/253 |
| 4,630,307 A | 12/1986 | Cok | 382/165 |
| 4,969,202 A | * 11/1990 | Groezinger | 382/199 |
| 5,373,322 A | 12/1994 | Laroche et al. | 248/273 |
| 5,583,794 A | * 12/1996 | Shimizu | 382/243 |
| 5,652,621 A | * 7/1997 | Adams, Jr. | 348/272 |
| 5,805,217 A | * 9/1998 | Lu | 348/273 |

* cited by examiner

Primary Examiner—Ngoc-Yen Vu
(74) Attorney, Agent, or Firm—Alston & Bird LLP

(57) ABSTRACT

A signal processing method for estimating luminance is provided, for use with matrix patterned image sensors where elected sensor pixels (G), preferably green pixels, from which luminance-representative signals are taken, only occupy alternate horizontal and vertical positions in the matrix pattern. The method is designed for detecting luminance contour edges and/or stripes in an image so as to enable images obtained form the sensor to be enhanced. Each pixel site (Hc) which is at the centre of both a row and a column of five pixels, and which is not the site of an elected (green) pixel, is identified and, for each such identified site (Hc), the signals output from the immediately adjacent four pixels (Gn,Ge,Gs,Gw) in said row and column are processed to establish both signal amplitude and pixel position. A luminance value for the pixel at the identified site (Hc) is evaluated from the amplitude values (G2,G3) of the median pair of said signal amplitudes in accordance with an algorithm where decision taking is based upon the location of the pixels from which the two signals (G1,G2) of highest amplitude emanate. When the two signals (G1, G2) of highest amplitude emanate from pixels in the same row or column, a further signal processing step is undertaken to identify, in said row and column, the signal outputs from the two respective next adjacent pixels (H1,H4) to the pixels having the highest and lowest signal amplitudes (G1,G4), and the signal output from the pixel at the identified site (Hc), to enable an amplitude comparison to be made according to the result of which one of said median pair (G2,G3) is selected. Signal processing methods for use with colour, monochrome and mixed colour/monochrome image sensors are claimed, as well as a single-chip camera, and also a video camera system, in which the claimed signal processing methods are implemented. the two signals (G1,G2) of highest amplitude emanate from pixels in the same row or column, a

23 Claims, 3 Drawing Sheets

IMAGE RESTORATION METHOD AND ASSOCIATED APPARATUS

BACKGROUND OF THE INVENTION

1. Field of the Invention

The present invention relates to image restoration techniques for use with image sensors and in particular to signal processing methods for luminance estimation for use with matrix array image sensors of the type commonly incorporated in video cameras.

2. Description of Related Art

The development of low-cost video cameras is driven by the existing Closed Circuit Television (CCTV) camera marketplace and by expected new markets, such as, for example, video conferencing. A major cost of these cameras is the image sensor chip whose cost is a monotonic function of sensor area. Two major goals of sensor designers are to improve sensitivity by increasing pixel area and improve resolution by increasing pixel count. Both of these steps have the disadvantage of increasing sensor area and hence sensor cost. If the sensor area is to remain constant then, until now, image resolution could only be increased at the cost of lowered sensitivity of the sensor and sensitivity could only be increased at the cost of lowered resolution.

In one known type of video camera a colour image is formed on a single image sensor device which is spatially divided into many (typically 100,000 or more) pixels and each pixel is covered with a colour filter corresponding to one of a number of desired spectral components. These may typically be red, green and blue components or, for example, cyan, magenta and yellow. Further colour sets are also sometimes used.

Many different types of colour matrix patterns are possible. The signal outputs of all the pixels are combined by means of a reading operation at the sensor device output. Many image restoration techniques have been developed for combining the signals from individual pixels in the matrix array into a composite image representation which presents a "real"-looking image to the human eye. One known technique involves superimposing a highpass-filtered or "edge-extracted" luminance signal onto lowpass-filtered or "spatially smoothed" component colour signals (e.g. red, green, blue) obtained from the pixel matrix. Such image restoration techniques can enhance the perceived resolution or "sharpness" of the video camera image.

One problem associated with image restoration is obtaining an accurate luminance signal from the sensor. It is known that the green spectral component is closely related to the luminance response of the human eye. It has therefore been known to use the signal outputs of green pixels, or alternatively another colour of pixel whose colour is representative of luminance, to obtain the necessary luminance signal. As the chosen colour of pixels (e.g. green) only account for some of the pixels in a colour image sensor array, however, it is desirable to estimate luminance at the remaining pixel sites.

It is an object of the present invention to provide a signal processing method for accurately estimating luminance for use in matrix array colour image sensors.

U.S. Pat. No. 4,630,307 describes a signal processing method for estimating luminance for. use in matrix array sensors having luminance-sensing pixels arranged in a chequerboard pattern. The method uses signals obtained from luminance-sensing pixels to estimate luminance values at pixels in the matrix array which are not capable of sensing luminance.

SUMMARY OF THE INVENTION

In the following text the term "row" is defined as a horizontal row and the term "column" is defined as a vertical row.

According to a first aspect, the present invention comprises a signal processing method for estimating luminance, for use with matrix patterned image sensors where elected sensor pixels from which luminance-representative signals are taken only occupy alternate horizontal and vertical positions in the matrix pattern, the method comprising identifying each pixel site which is at the centre of both a row and a column of five pixels and which is not the site of a said elected sensor pixel, and for each such identified site processing the signals output from the immediately adjacent four pixels in said row and column to establish both signal amplitude and pixel position and evaluating a luminance value for the pixel of the identified site from the amplitude values of the median pair of said signal amplitudes in accordance with an algorithm where decision taking is based upon the location of the pixels from which the two signals of highest amplitude emanate, the algorithm being such that when the two signals of highest amplitude emanate from pixels in the same row or column a further signal processing step is undertaken to identify, in said row and column, the signal outputs from the two respective next adjacent pixels to the pixels having the highest and lowest signal amplitudes, and the signal output from the pixel at the identified site, to enable an amplitude comparison to be made according to the result of which one of the said median pair is selected.

One advantage of the signal processing method according to the first aspect of the invention is that it utilizes signal outputs from pixels in said row and column which pixels are-next adjacent to the highest and lowest amplitude ones of said four pixels immediately adjacent the identified site.

Preferably, the selected one of said median pair is the higher amplitude one where the signal output from the next adjacent pixel to said pixel having the highest signal amplitude is closer in amplitude to the signal output from the pixel at the identified site than the signal output from the next adjacent pixel to said pixel having the lowest signal amplitude. Preferably, also, the selected one is the lower amplitude one of said median pair where the signal output from the next adjacent pixel to said pixel having the lowest signal amplitude is closer in amplitude to the signal output from the pixel at the identified site than the signal output from the next adjacent pixel to said pixel having the highest signal amplitude.

According to a second aspect the present invention comprises a signal processing method for estimating luminance for use with matrix array colour image sensors in which elected luminance-sensing pixels capable of producing signals representative of luminance are arranged in a chequerboard pattern with colour sensing pixels which are capable of producing signals representative of colour, the method comprising the steps of: ranking the signal values representative of luminance obtained from a cluster of four luminance-sensing pixels surrounding a first colour-sensing pixel, analyzing the spatial distribution of said ranked signal values so as to detect the presence of any diagonal luminance contour edge, horizontal luminance contour stripe or vertical luminance contour stripe at said first colour-sensing pixel, and determining an estimated discrete signal value representative of luminance for said first colour-sensing pixel based on one or more middle ranked signal values in a colour-enhancing fashion dependent upon, firstly, whether any diagonal luminance contour edge is detected and, secondly, whether any horizontal or vertical luminance contour stripe which is detected is interpreted as a dark stripe on a light background or a light stripe on a dark background, wherein when a horizontal or vertical luminance contour stripe is detected, the signal values representative of colour obtained from a plurality of said colour-sensing pixels in the vicinity of said cluster of four luminance-sensing pixels are compared so as to determine whether said detected horizontal or vertical luminance contour stripe is interpreted as a dark stripe on a light background or a light stripe on a dark background.

One advantage of the signal processing method according to the second aspect of the invention is that it utilizes colour signal values from pixels other than said elected luminance-sensing pixels to influence the estimated luminance signal value for said first colour-sensing pixel.

Preferably, said plurality of colour-sensing pixels in the vicinity of said cluster of four luminance-sensing pixels includes said first colour-sensing pixel, a second colour-sensing pixel disposed within the detected luminance contour stripe and a third colour-sensing pixel disposed outwith the detected luminance contour stripe. This increases the likelihood of accurately detecting and enhancing horizontal and vertical luminance contour stripes occurring in the image. The method thus enables real-time images obtained from the image sensor to be enhanced so as to improve the perceived resolution of the sensor to the human eye.

The estimated discrete signal value representative of luminance is preferably based on the mean of the middle ranking signal values when a diagonal contour edge is detected at first colour-sensing pixel.

Advantageously, said estimated discrete value is based on a corresponding one of the two middle ranking values when a stripe detected at said first colour-sensing pixel is interpreted as a dark stripe on a light background or as a light stripe on a dark background. Preferably said corresponding one of the two middle ranking signal values is the lower ranked one when a dark stripe on a light background is detected and is the higher ranked one when a light stripe on a dark background is detected.

A diagonal contour edge is preferably detected when the two highest ranking signal values are obtained from luminance-sensing pixels disposed diagonally adjacent one another.

A horizontal or vertical contour stripe is preferably detected when the two highest ranking signal values are obtained from luminance-sensing pixels disposed horizontally or vertically opposite one another.

Where a horizontal or vertical stripe is detected, the signal value obtained from said first colour-sensing pixel is preferably compared with the signal values obtained from second and third colour-sensing pixels disposed respectively vertically and horizontally opposite said first colour-sensing pixel and immediately adjacent to the luminance-sensing pixels having the highest and lowest ranked signal values. Conveniently, if the signal value of said first colour-sensing pixel is closest in value to the signal value of the pixel immediately adjacent said highest ranked signal value pixel the stripe is interpreted as a light stripe on a dark background and if the signal value of the first colour-sensing pixel is closest in value to the signal value pixel of the pixel immediately adjacent said lowest ranked signal value pixel the stripe is interpreted as a dark stripe on a light background.

Said elected luminance-sensing pixels may be pixels which are capable of producing signals representative of both luminance and colour.

The signal processing steps of the method according to the second aspect of the invention are preferably repeated for every colour-sensing pixel in the matrix array sensor which is not also an elected luminance-sensing pixel and which is at the centre of both a row and a column of five pixels. In this manner a respective estimated discrete signal value representative of luminance is determined for each such colour-sensing pixel in the matrix array.

The estimated luminance signal value obtained from each such colour-sensing pixel in the array may provide a luminance signal for a luminance channel of a camera incorporating the image sensor array. Said estimated luminance channel signal may be highpass-filtered to obtain an "edge-extracted" luminance signal. Alternatively, said estimated luminance signal may be lowpass-filtered and further processed to produce a signal which approximates to an "edge-extracted" luminance signal.

Signals representative of colour obtained from colour-sensing pixels in the array may be processed to obtain lowpass-filtered colour channel signals in a colour camera which incorporates the sensor array. Where said elected luminance-sensing pixels also sense colour, the signals from the elected luminance-sensing pixels in the array may also be processed to obtain a lowpass-filtered signal for an additional colour channel. The "edge-extracted" luminance signal may be superimposed on said colour channel signals to obtain full colour and luminance information for every pixel which is used to produce a contour-enhanced (i.e. improved resolution) image to the human-eye.

The elected luminance-sensing pixels are preferably green pixels. The colour-sensing pixels are preferably red and blue pixels. Alternatively, the matrix array is comprised of magenta, cyan and yellow pixels. Other colour sets are also possible.

Where the matrix array is comprised of red, green and blue pixels, the pixel signals are read into respective red, green and blue colour channels. The three colour channel signals are preferably processed to obtain lowpass-filtered, "spatially-smoothed" respective red, green and blue channel signals. In this way, red, green and blue colour information is obtained for every pixel in the array.

Where green pixels are the elected luminance-sensing pixels, the green signal values are preferably used in raw, uncorrected colour form.

The matrix array image sensor may, alternatively, comprise a mixed colour and monochrome array in which monochrome, luminance-sensing pixels are arranged in a chequerboard pattern with colour-sensing pixels.

According to a third aspect, the invention comprises a signal processing method for estimating luminance, for use with matrix patterned sensors where elected sensor pixels from which luminance-representative signals are taken only occupy alternate horizontal and vertical matrix element positions in the matrix pattern, the method comprising identifying each matrix element site which is at the centre of both a row and a column of seven matrix elements and which is not the site of a said elected sensor pixel, and for each such identified site processing the signals output from the immediately adjacent four pixels in said row and column to establish both signal amplitude and pixel position and evaluating a luminance value for the matrix element of the identified site from the amplitude values of the median pair of said signal amplitudes in accordance with an algorithm where decision taking is based upon the location of the pixels from which the two signals of highest amplitude emanate, the algorithm being such that when the two signals of highest amplitude emanate from pixels in the same row or column a further signal processing step is undertaken to identify outputs in said row and column from the two pixels respectively next adjacent to the pixels having the highest and lowest signal amplitudes, and to identify the mean of the signal outputs from the eight pixels diagonally adjacent to, and arranged around, said four pixels in said row and column, to enable an amplitude comparison to be made according to the result of which one of the said median pair is selected.

According to a fourth aspect the invention comprises a signal processing method for estimating luminance for use in a matrix array monochrome image sensor in which elected luminance-sensing pixels capable of producing signals representative of luminance are arranged in a chequerboard pattern with non-luminance-representative matrix array elements which do not produce signals, the method comprising the steps of: ranking the signal values representative of luminance obtained from a cluster of four luminance-sensing pixels surrounding a first non-luminance-representative matrix element, analyzing the spatial distribution of said ranked signal values so as to detect the presence of any diagonal luminance contour edge, horizontal luminance contour stripe or vertical luminance contour stripe at said first non-luminance-representative matrix element, and determining an estimated discrete signal value representative of luminance for said non-luminance-representative matrix element based on one or more middle ranked signal values in a contour-enhancing fashion dependent upon, firstly, whether any diagonal luminance contour edge is detected and, secondly, whether any horizontal or vertical luminance contour stripe which is detected is interpreted as a dark stripe on a light background or a light stripe on a dark background, wherein, when a horizontal or vertical luminance contour stripe is detected the signal values representative of luminance obtained from at least second and third luminance-sensing pixels disposed respectively within and outwith the detected luminance contour stripe are compared with the mean of the signal values obtained from a plurality of further luminance-sensing pixels in the vicinity of said cluster of four luminance-sensing pixels so as to determine whether said horizontal or vertical stripe is interpreted as a dark stripe on a light background or a light stripe on a dark background.

An advantage of this fourth method is that the signal value from at least one pixel disposed within the detected luminance contour stripe is compared with signal values from pixels disposed outwith said stripe so as to determine whether the stripe should be interpreted as a dark stripe on a light background or a light stripe on a dark background.

Preferably said plurality of further luminance-sensing pixels comprise eight pixels, each pixel being disposed diagonally adjacent one of said cluster of four luminance-sensing pixels surrounding said first non-luminance representative matrix element.

Advantageously said second and third luminance-sensing pixels are disposed horizontally and vertically opposite said first non-luminance representative matrix element and adjacent to the two of the cluster of four luminance-sensing pixels which have the highest and lowest ranked signal values.

The steps of the signal processing method according to the fourth aspect of the invention may be repeated for each non-luminance representative matrix element in the matrix array which is at the centre of both a row and a column containing seven matrix elements.

According to a fifth aspect, the invention provides a camera comprising a matrix array image sensor and signal processing means for carrying out the signal processing method according to any of the above-mentioned first, second, third and fourth aspects of the invention. The image sensor may be a Charge Coupled Device (CCD) or CMOS array.

BRIEF DESCRIPTION OF THE SEVERAL VIEWS OF THE DRAWING(S)

Preferred embodiments of the invention will now be described by way of example only and with reference to the accompanying drawings in which.

Figure 2:
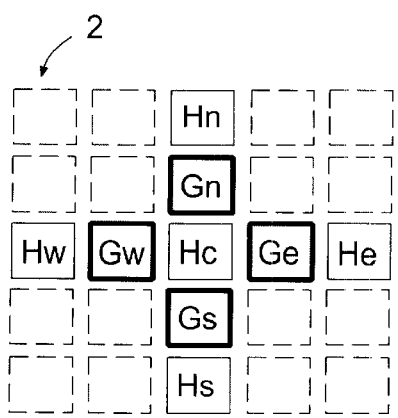
FIG. 2 is a schematic illustration of a 5×5 pixel template centered on a non-Green pixel, Hc, of the image sensor of FIG. 1.
Figure 4:
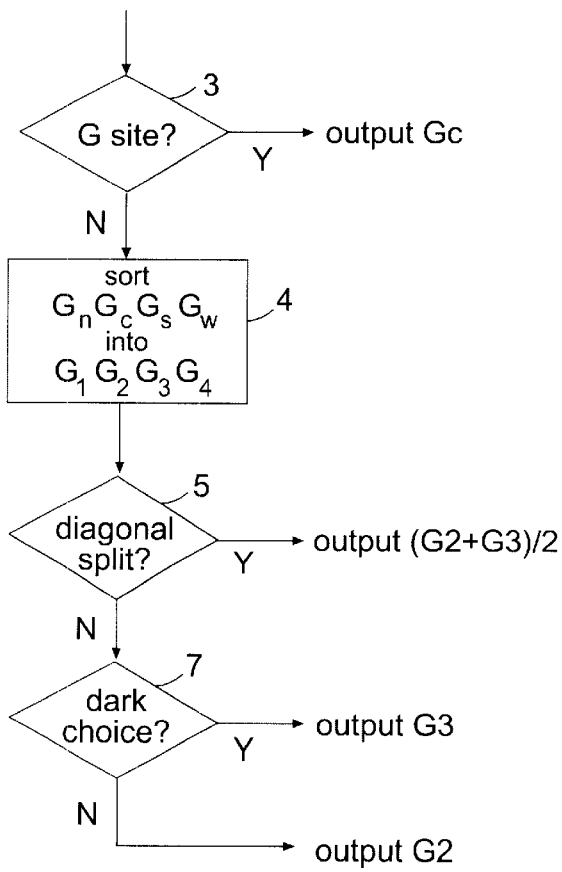
Figure 3A:
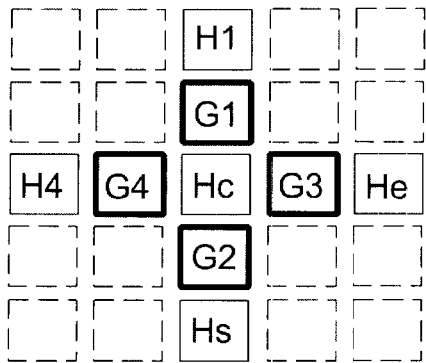
Figure 3B:
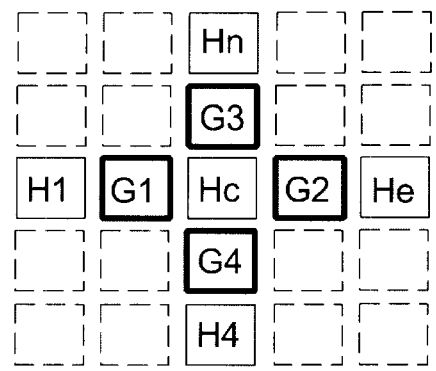
Figure 5:
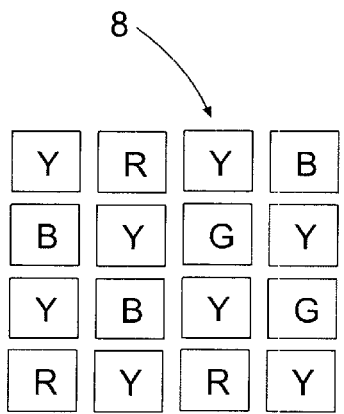
Figure 6:
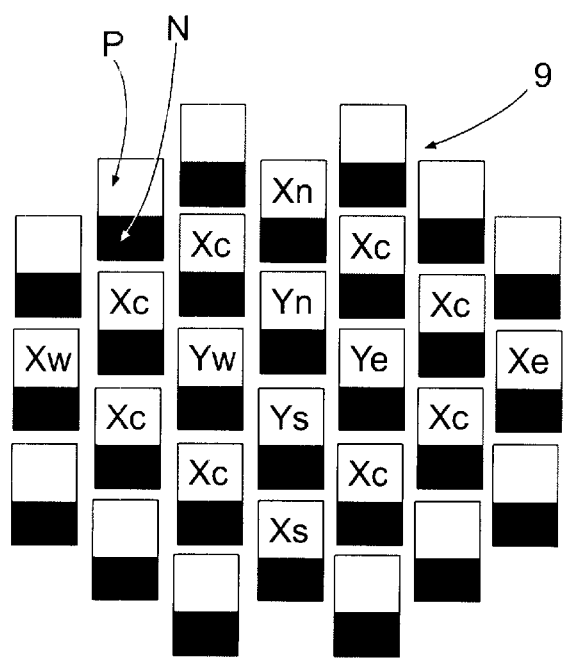
Figure 7:
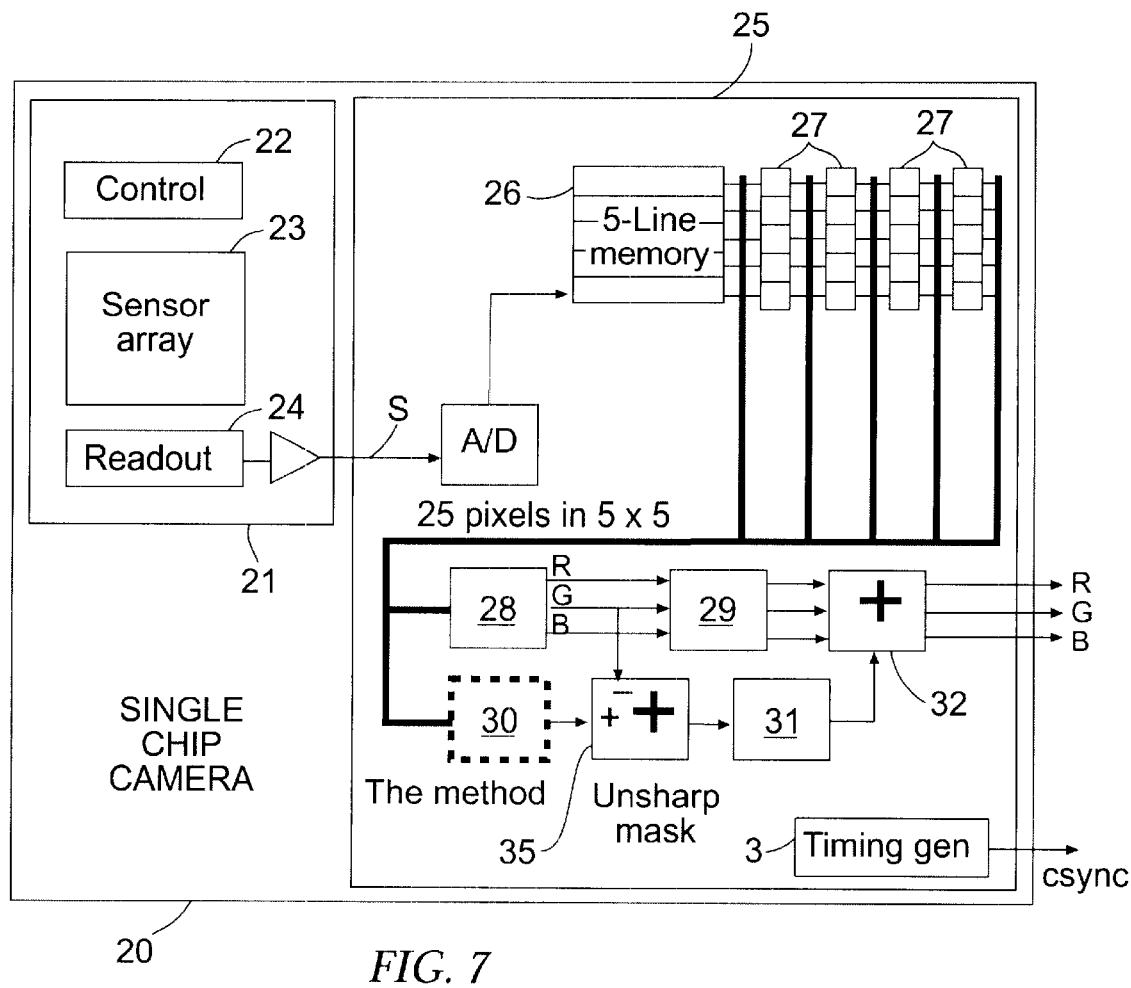
Figure 8:
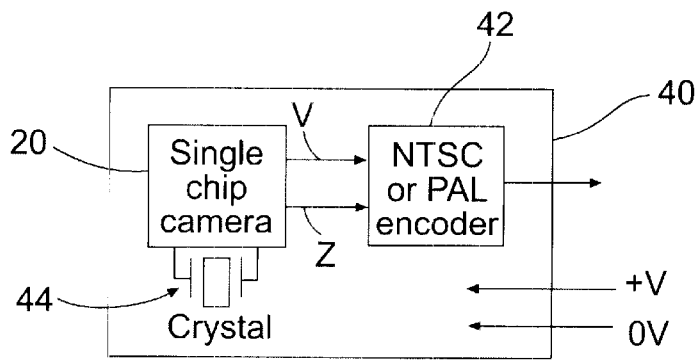

FIGS. 3(a) and (b) illustrate two possible situations where a horizontal or vertical stripe is detected at the non-Green pixel, Hc, of FIG. 2;

FIG. 4 is a flow diagram illustrating schematically a luminance estimation method according to the invention;

FIG. 5 is a schematic illustration of a 4×4 portion of a mixed colour and monochrome matrix image sensor;

FIG. 6 is a schematic illustration of a portion of a monochrome image sensor array which may be used with a further method according to the invention;

FIG. 7 is a block diagram illustrating schematically a single-chip colour video camera in which signal processing methods according to the invention are carried out; and FIG. 8 is a block diagram illustrating schematically a video camera system 40 incorporating the chip camera of FIG. 7.

DETAILED DESCRIPTION OF THE INVENTION

Figure 1:
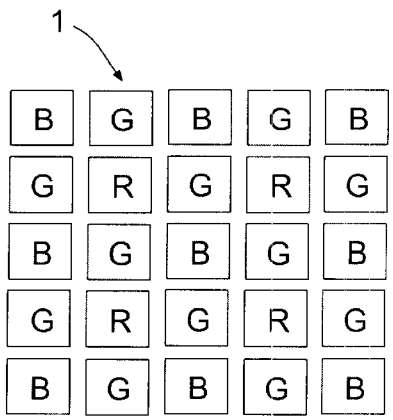
FIG. 1 is a schematic illustration of a 5×5 portion of a colour (RGB) matrix image sensor which may be used with a signal processing method for luminance estimation according to the invention.

FIG. 1 illustrates schematically a 5×5 pixel portion 1 of a single image sensor device having a Red (R), Green (G), Blue (B) colour matrix pattern as disclosed in U.S. Pat. No. 3,971,065 (Bayer). The pattern contains more Green (G) pixels than Red (R) or Blue (B) because Green is the principal, primary colour component of luminance. The Green pixels are disposed in a chequerboard pattern with the non-green (i.e. R,B) pixels, the green pixels (G) thus occupying alternate horizontal and vertical positions in the matrix.

The sensor device is spatially divided into typically 100,000 or more pixels and each pixel is covered with a colour filter corresponding to the desired spectral components. The device is incorporated in an electric camera (see FIGS. 7 and 8) in which signal outputs from the pixels are read out at an array output of the sensor device to provide three component colour channels, as in a normal electronic colour camera.

The component colour channels are interpolated to provide missing data by lowpass-filtering using a square area template, typically 5×5 pixels. Although Green data is more plentiful than Red or Blue, and accordingly more Green pixels are covered by the lowpass-filter template than Red or Blue, the Green colour-signal is essentially treated identically to Red and Blue. In each case, the component colour channel represents a lowpass-filtered (spatially smoothed) version of the ideal component colour channel response.

In addition to the three component colour channels normally present in an electronic colour camera, we form a fourth channel representing an estimate of luminance. This is achieved using the following process.

The Green pixels (G) are elected to be "luminance-sensing" pixels and Green pixel signals are taken to be representative of luminance as well as being representative of Green colour. Green is the dominant contributor to luminance, as perceived by the human eye, and is the most densely sampled colour component in the matrix pattern of the FIG. 1 sensor device. It is used in a unique fashion when estimating luminance. The luminance estimate is constructed by interpolating non-Green pixels in a luminance contour-enhancing fashion, complementing the contour-suppressing interpolation of the colour channel processing.

The operations described below are symmetrical in an orthogonal sense, that it to say transformations such as mirroring or rotation through multiples of 90 degrees do not change their result. With no loss of generality, we associate compass direction N (north) with the top of the image.

Sites where Green is present require no processing. In this case luminance is given by the centre-pixel output, Gc. A luminance estimate for each "missing Green" (i.e. Red (R) or Blue (B) site) which is at the centre of both a row and a column of five pixels is obtained using a 5×5 template 2 centred on the "missing Green" site, Hc, as illustrated schematically in FIG. 2, wherein neighbours to the N,S,E and W are known to be Green. These appear as Gn, Ge, Gs, and Gw in FIG. 2. We identify non-Green pixels in the 5×5 pixel vertical cross pattern of FIG. 2 as Hn, He, Hs, and Hw, being the far-neighbours of Gn, Ge, Gs and Gw respectively. These H pixels will all be either Red or Blue depending on the colour of the centre pixel Hc.

In the first method described here, we first sort the four G neighbours by descending order of value (i.e. amplitude) into G1 (max), G2, G3, G4 (min). If G1 and G2 form a diagonally-adjacent pair then we infer that the image contains a local diagonal edge (of a luminance contour) and the missing luminance value is estimated or "restored" as the average of the median pair, G2 and G3. In this case the values of H pixels are unused.

If G2 and G2 are horizontally or vertically opposed across the "missing Green" pixel, Hc, for example as shown in FIGS. 3(a) and (b), we infer that the image contains part of a horizontal or vertical luminance contour line or "stripe". To determine whether the stripe is a dark stripe on a light background or a light stripe on a dark background we examine the far neighbours H1 and H4 of G1 and G4 respectively to determine which of these is closer in value to Hc. If H1 is closer then we infer that we have a light stripe on a dark background and we restore luminance at the missing Green site, Hc, at a value equal to G2, i.e. the higher of the two middle ranked values G2, G3. If H4 is closer we infer that we have a dark stripe on a light background and we restore luminance at Hc at a value equal to G3 i.e. the lower of the two middle ranked values. In each case these median values (G2, G3) are generally safer alternatives to the maximum or minimum values (G1, G4).

FIG. 4 illustrates a decision flow chart which summarizes the luminance estimation method applied so as to step through the image, examining every pixel site which is at the centre of both a row and a column of five pixels. The first branch 3 depends on whether the centre-pixel site contains a Green pixel or not. If yes (Y), the green signal Gc is output. If no (N), Gn, Gc, Gs, and Gw are sorted into G1, G2, G3, G4 (see box 4). The second branch 5 depends on whether a diagonal split is detected, i.e. G1 is diagonally adjacent to G2. The third branch 7 is dependent on whether a "dark choice" is made, i.e. far-neighbouring H4 is closer than H1 in value to Hc.

G1 and G2 being horizontally or vertically opposed across the "missing Green" pixel, Hc, may also indicate respectively the presence of a sharp horizontal or vertical luminance contour edge (rather than a stripe) in the image. The second branch of the decision process, i.e. the "dark choice" of FIG. 4, produces equally acceptable restored luminance values for the missing-Green pixel in this scenario. Flat, i.e. relatively constant luminance, areas of the image will also be detected as either diagonal edges, or vertical or horizontal stripes, using the above-described processing method, which produces acceptable restored luminance values for such flat areas.

The estimated luminance signal obtained for a non-Green pixel sited at the centre of both a row and a column of five pixels provides an estimated luminance signal for the fourth i.e. luminance channel of the camera. This signal then has subtracted from it a spatially smoothed version of the luminance-representative signal, this being the particular output of a 5×5 square area lowpass-filtering template corresponding to the colour used for luminance sensing (in this case Green). This technique, sometimes known as "un-sharp masking", obtains a signal which approximates to a highpass-filtered (i.e. "edge-extracted") luminance signal. The "edge-extracted" signal is then superimposed on to the spatially-smoothed colour channel signals obtained over the same 5×5 pixel area so as to produce a Red, Green, Blue (RGB) pixel triplet including full colour and luminance information. RGB pixel triplet signals obtained in this way enable the camera to produce a contour-enhanced image which is more resolved, and thus more pleasing, to the human eye, than the image obtained purely from the spatially smoothed colour channel signals.

The above-described luminance estimation signal processing method restores luminance values to most pixel sites in the sensor array and gives subjectively excellent "end-image" results for most real scenes.

The method is particularly successful in detecting and restoring luminance contours of diagonal edge, vertical stripe and horizontal stripe forms, these having been particularly difficult to detect and restore accurately using previously known luminance estimation/interpolation techniques.

Conveniently, in its "raw" form Green contains components of Red and Blue present due to imperfections of the Green filter spectral response, which can improve its utility as an estimate of luminance. Although it is normal practice to compensate electronically for incorrect colour rendering, it is better to apply luminance estimation processing before colour-compensation processing on Green.

It should be noted that colour combinations other than RGB may be used. The above procedure may produce similarly good results for these alternative combinations provided the colour that is elected for the luminance-sensing pixels in place of Green is representative of luminance to the human eye. For example, a yellow, cyan, magenta colour combination could be used.

The image sensor device is typically a CCD or CMOS array sensor. The production process for both types of sensor is well disposed to deposition of the colour filters when the products are in silicon-wafer form. This enhances cost benefit. Signal processing circuitry for carrying out the above-described luminance estimation according to the flow chart of FIG. 4 can be provided in the image sensor chip, if desired. Alternatively, or additionally, separate electronic circuitry can be provided in the camera.

FIG. 5 shows schematically a portion 8 of a mixed monochrome and colour image sensor in which monochrome (e.g. white, unfiltered) pixels (Y) are arranged in a chequerboard pattern with coloured pixels which may be coloured in accordance with any desired colour set but in FIG. 5 are shown as Red(R), Green(G), Blue(B) pixels. The luminance estimation method described in relation to FIGS. 1 to 4 can also be applied to this type of sensor array by electing the monochrome pixels as the "luminance-sensing" pixels. Colour restoration is not applied in this case.

The above-described luminance estimation method can also be adapted for application to a monochrome matrix array image sensor. FIG. 6 shows schematically a portion 9 of a monochrome sensor array in which photosensitive pixels (P), shown in white, are arranged in a chequerboard pattern with non-photosensitive areas (N), shown shaded, which are occupied by overhead (light-insensitive) circuitry.

A cluster of four pixels Yn, Ye, Ys, Yw surrounding a non-photosensitive centre site C take the place of Gn, Ge, Gs, Gw respectively in FIG. 2. These are ranked in descending value order as Y1 (max), Y2, Y3, Y4 (min) and are used to obtain a median average (the mean of Y2 and Y3) for estimated luminance at centre site C in cases where a diagonal split is detected. The principal difference between the monochrome technique for FIG. 6 and the colour technique for FIG. 2 is in the "dark choice" step, required in cases where a diagonal split is not detected. Here, in order to infer whether the image contains a dark stripe on a light background or a light stripe on a dark background, the pixels Xn, Xe, Xs, Xw, which are the far neighbours of Yn, Ye, Ys, Yw in a vertical cross pattern centered on C, take the place of Hn, He, Hs, Hw in FIG. 2 respectively.

Hc in FIG. 2 is, however, unobtainable in this case as centre-site C does not contain a pixel. Instead, we calculate the average (i.e. mean) of the eight ring-surrounding pixels, Xc, which are located diagonally adjacent to Yn, Ye, Ys, Yw as shown in FIG. 6. The far neighbours X1 and X4 of Y1 (max) and Y4 (min) respectively are compared with the mean, M, of the eight ring-surrounding pixels, Xc. If X1 is closer in value than X4 to M we infer a dark stripe on a light background and luminance is estimated or "restored" at centre-site C as Y3. If X4 is closer in value than X1 to M we infer a light stripe on a dark background and luminance is estimated or restored at C as Y2.

By using this "monochrome" luminance estimation method, the pixels representing luminance can be maximized in size (50% of the number of pixels present in the colour array of FIG. 1 having effectively been discarded in the monochrome version of the array) to enable the realization of a monochrome video camera of increased sensitivity without the resulting unacceptable loss of image resolution, due to the lower pixel count, which would be experienced if the luminance estimation technique were not employed.

The skilled reader will be aware of various suitable ways of implementing the necessary electronic circuitry to perform the signal processing operations illustrated by FIG. 4. This may be achieved, for example, in integrated circuitry which may, as afore-mentioned, be provided on the image sensor chip. FIG. 7 is a schematic architectural overview of a single-chip colour video camera 20. The camera 20 incorporates a sensor subsystem 21 comprising a control unit 22, and image sensor array 23, and a readout unit 24. Sensor output S, is digitised (block A/D) in a processor subsystemn 25 and stored in a 5-line memory 26. As a new pixel is written into memory, a 5×5 pixel block is read out from 5-pixel registers 27 and processed in two channels, the upper channel including a lowpass filter 28 and processor block 29 acting on colour date. The lower channel includes signal processing apparatus at block 30 for carrying out the luminance estimation signal processing method already described. A subtractor circuit 35 is used to perform the un-sharp masking process in which the spatially-smoothed version of the Green signal is subtracted from the luminance estimate signal. After further processing at block 31 to obtain the "edge-extracted" luminance signal, the colour and luminance signals are recombined using adding circuit 32 to produce the final RGB pixel triplet. A timing generator 33 is also provided for the processor subsystem 25 as shown in FIG. 7.

FIG. 8 shows an NTSC or PAL (phase alternate line) video camera system 40 incorporating the chip camera 20 of FIG. 7. The system 40 includes an NTSC or PAL encoder 42 which receives the RGB video signal V and a synchronising signal Z from the camera 20. The system also includes a resonant crystal 44 which functions as a master clock for driving the camera 20.

What is claimed is:

1. A signal processing method for estimating luminance, for use with matrix patterned image sensors where elected sensor pixels (G) from which luminance-representative signals are taken only occupy alternate horizontal and vertical positions in the matrix pattern, the method comprising identifying each pixel (Hc) which is at the centre of both a row and a column of five pixels and which is not the site of one of said elected sensor pixels (G), and for each such identified pixel (Hc) processing the signals output from the immediately adjacent four pixels (Gn, Ge, Gs, Gw) in said row and column to establish both signal amplitude and pixel position and evaluating a luminance value for the identified pixel from the amplitude values (G2, G3) of a median pair of said signal amplitudes in accordance with an algorithm where decision taking is based upon the location of the pixels from which the two signals (G1, G2) of highest amplitude emanate, the algorithm being such that when the two signals (G1, G2) of highest amplitude emanate from pixels in the same row or column a further signal processing step (7) is undertaken to identify, in said row and column, the signal outputs from the two respective next adjacent pixels (H1, H4) to the pixels having the highest and lowest signal amplitudes (G1, G4), and the signal output from the identified pixel (Hc), to enable an amplitude comparison to be made according to a result of which one of said median pair (G2, G3) is selected.

2. A signal processing method according to claim 1, wherein the selected one of said median pair (G2, G3) is the higher amplitude one (G2) where the signal output from the next adjacent pixel (H1) to said pixel having the highest signal amplitude (G1) is closer in amplitude to the signal output from the pixel at the identified pixel (Hc) than the signal output from the next adjacent pixel (H4) to said pixel having the lowest signal amplitude (G4).

3. A signal processing method according to claim 1, wherein the selected one of said median pair (G2, G3) is the lower amplitude one (G3) where the signal output from the next adjacent pixel (H4) to said pixel having the lowest signal amplitude (G4) is closer in amplitude to the signal output from the pixel at the identified pixel (Hc) than the signal output from the next adjacent pixel (H1) to said pixel having the highest amplitude (G1).

4. A signal processing method for estimating luminance for use with matrix array colour image sensors in which elected luminance-sensing pixels (G) capable of producing signals representative of luminance are arranged in a chequerboard pattern with colour sensing pixels (R, B) which are capable of producing signals representative of colour, the method comprising the steps of: ranking the signal values (G1, G2, G3, G4) representative of luminance obtained from a cluster of four luminance-sensing pixels (Gn, Ge, Gs, Gw) surrounding a first colour-sensing pixel (Hc), analysing the spatial distribution of said ranked signal values (G1, G2, G3, G4) so as to detect the presence of any diagonal luminance contour edge, horizontal luminance contour stripe or vertical luminance contour stripe at said first colour-sensing pixel (Hc), and determining an estimated discrete signal value representative of luminance for said first colour-sensing pixel based on one or more middle ranked signal values (G2, G3) in a contour-enhancing fashion dependent upon, firstly, whether any diagonal luminance contour edge is detected and, secondly, whether any horizontal or vertical luminance contour stripe which is detected is interpreted as a dark stripe on a light background or a light stripe on a dark background, wherein when the horizontal or vertical luminance contour stripe is detected the signal values representative of colour obtained from a plurality of said colour-sensing pixels (R, B) in the vicinity of said cluster of four luminance-sensing pixels (Gn, Ge, Gs, Gw) are compared so as to determine whether said detected horizontal or vertical luminance contour stripe is interpreted as a dark stripe on a light background or a light stripe on a dark background.

5. A signal processing method according to claim 4, wherein said plurality of colour-sensing pixels in the vicinity of said cluster of four luminance-sensing pixels (Gn, Ge, Gs, Gw) includes said first colour-sensing pixel (Hc), a second colour-sensing pixel (H1,H4) disposed within the detected horizontal or vertical luminance contour stripe and a third colour-sensing pixel (H4,H1) disposed outwith the detected horizontal or vertical luminance contour stripe.

6. A signal processing method according to claim 4, wherein the estimated discrete signal value representative of luminance is based on the mean of the middle ranking signal values (G2, G3) when a diagonal contour edge is detected at said first colour-sensing pixel (Hc).

7. A signal processing method according to claim 4, wherein said estimated discrete signal value is based on a corresponding one of the two middle ranking signal values (G2, G3) when a stripe detected at said first colour-sensing pixel (Hc) is interpreted as a dark stripe on a light background or as a light stripe on a dark background.

8. A signal processing method according to claim 7, wherein said corresponding one of the two middle ranking signal values (G2, G3) is the lower ranked one (G3) when a dark stripe on a light background is detected and is the higher ranked one (G2) when a light stripe on a dark background is detected.

9. A signal processing method according to claim 4, wherein a diagonal contour edge is detected when the two highest ranking signal values (G1, G2) are obtained from luminance-sensing pixels (G) disposed diagonally adjacent one another.

10. A signal processing method according to claim 4, wherein a horizontal or vertical contour stripe is detected when the two highest ranking signal values (G1, G2) are obtained from luminance-sensing pixels (G) disposed horizontally or vertically opposite one another.

11. A signal processing method according to claim 4, wherein, where a horizontal or vertical stripe is detected, the signal value obtained from said first colour sensing pixel (Hc) is preferably compared with the signal values obtained from second and third colour-sensing pixels (H1, H4) disposed respectively vertically and horizontally opposite said first colour-sensing pixel (Hc) and immediately adjacent to the luminance-sensing pixels having the highest and lowest ranked signal values (G1, G4), and if the signal value of said first colour-sensing pixel (Hc) is closest in value to the signal value of the pixel (H1) immediately adjacent to said highest-ranked signal value (G1) the stripe is interpreted as a light stripe on a dark background, and if the signal value of said first colour-sensing (Hc) is closest in value to the signal value of the pixel (H4) immediately adjacent to said lowest-ranked signal value (G4) the stripe is interpreted as a dark stripe on a light background.

12. A signal processing method according to claim 4, wherein the steps of the method are repeated for every colour-sensing pixel (R,B) in the matrix array sensor which is not also an elected luminance-sensing pixel (G) and which is at a center of both a row and a column of five pixels.

13. A signal processing method according to claim 4, wherein the estimated discrete signal value representative of luminance obtained from each said colour sensing pixel (R, B) in the array is used to provide a luminance signal for a luminance channel (35, 31) of a camera (20) incorporating an image sensor array (23), which luminance signal is further processed to obtain an "edge-extracted" luminance signal which is, in turn, superimposed on lowpass filtered colour channel signals (R, G, B) in the camera (20) so as to provide luminance information for every pixel in the array.

14. A signal processing method for estimating luminance, for use with matrix patterned sensors where elected sensor pixels (P) from which luminance-representative signals are taken only occupy alternate horizontal and vertical matrix element positions in the matrix pattern, the method comprising identifying each matrix element site (C) which is at the centre of both a row and a column of seven matrix elements and which is not the site of a said elected sensor pixel (P), and for each such identified site (C) processing the signals output from the immediately adjacent four pixels (Yn, Ye, Ys, Yw) in said row and column to establish both signal amplitude and pixel position and evaluating a luminance value for the matrix element of the identified site (C) from the amplitude values of the median pair (Y2, Y3) of said signal amplitudes in accordance with an algorithm where decision taking is based upon the location of the pixels from which the two signals (Y1, Y2) of highest amplitude emanate, the algorithm being such that when the two signals (Y1, Y2) of highest amplitude emanate from pixels in the same row or column a further signal processing step is undertaken to identify outputs (X1, X4) in said row and column from the two pixels respectively next adjacent to the pixels having the highest and lowest signal amplitudes (Y1, Y4), and to identify the mean (M) of signal outputs from the eight pixels (Xc) diagonally adjacent to, and arranged around, said four pixels (Yn, Ye, Ys, Yw) in said row and column, to enable an amplitude comparison to be made according to the result of which one of the said median pair (Y2, Y3) is selected.

15. A signal processing method for estimating luminance for use in a matrix array monochrome image sensor in which elected luminance-sensing pixels (P) capable of producing signals representative of luminance are arranged in a chequerboard pattern with non-luminance-representative matrix array elements (N) which do not produce signals, the method comprising the steps of: ranking the signal values (Y1, Y2, Y3, Y4) representative of luminance obtained from a cluster of four luminance-sensing pixels (Yn, Ye, Ys, Yw) surrounding a first non-luminance-representative matrix element (C), analysing the spatial distribution of said ranked signal values so as to detect the presence of any diagonal luminance contour edge, horizontal luminance contour stripe or vertical luminance contour stripe at said first non-luminance-representative matrix element (C), and determining an estimated discrete signal value representative of luminance for said non-luminance-representative matrix element (C) based on one or more middle ranked signal values (Y2, Y3) in a contour-enhancing fashion dependent upon, firstly, whether any diagonal luminance contour edge is detected and, secondly, whether any horizontal or vertical luminance contour stripe which is detected is interpreted as a dark stripe on a light background or a light stripe on a dark background, wherein when a horizontal or vertical luminance contour stripe is detected the signal values representative of luminance obtained from at least second and third luminance-sensing pixels (XI, X4) disposed respectively within and outwith the detected horizontal or vertical luminance contour stripe are compared with the mean (M) of the signal values obtained from a plurality of further luminance-sensing pixels (Xc) in the vicinity of said cluster of four luminance-sensing pixels (Yn, Ye, Ys, Yw) so as to determine whether said horizontal or vertical luminance contour stripe is interpreted as a dark stripe on a light background or a light stripe on a dark background.

16. A signal processing method according to claim 15, wherein said plurality of further luminance-sensing pixels (Xc) comprises eight pixels, each pixel being disposed diagonally adjacent one of said cluster of four luminance-sensing pixels (Yn, Ye, Ys, Yw) surrounding said first non-luminance representative matrix element (C).

17. A signal processing method according to claim 15, wherein said second and third luminance-sensing pixels (X1, X4) are disposed horizontally and vertically opposite said first non-luminance representative matrix element (C) and adjacent to the two of the cluster of four luminance-sensing pixels (Yn, Ye, Ys, Yw) which have the highest and lowest ranked signal values (Y1, Y4).

18. A signal processing method according to claim 15, wherein the steps of the method are repeated for each non-luminance representative matrix element in the matrix array which is at the centre of both a row and a column containing seven matrix elements.

19. A camera (20) comprising a matrix array image sensor (21) and signal processing means (25) formed and arranged for carrying out the signal processing method according to claim 1.

20. A camera (20) according to claim 19, wherein said matrix array image sensor (21) comprises an array of red (R), green (G) and blue (B) pixels, and said elected luminance-sensing pixels are green pixels.

21. A camera (20) according to claim 19, wherein said matrix array image sensor (21) comprises a mixed colour and monochrome array in which monochrome luminance-sensing pixels (Y) are arranged in a chequerboard pattern with colour-sensing pixels (R, G, B).

22. A camera according to claim 19, wherein said matrix array image sensor (21) and said signal processing means (25) are provided together in an integrated circuit.

23. A camera system incorporating a video camera according to claim 19.

* * * * *

UNITED STATES PATENT AND TRADEMARK OFFICE
CERTIFICATE OF CORRECTION

PATENT NO. : 6,493,029 B1
DATED : December 10, 2002
INVENTOR(S) : Denyer et al.

It is certified that error appears in the above-identified patent and that said Letters Patent is hereby corrected as shown below:

<u>Title page,</u>
Item [22], PCT Filed, "Jun. 5, 1997" should read -- Mar. 5, 1997 --.

Signed and Sealed this

Tenth Day of June, 2003

JAMES E. ROGAN
*Director of the United States Patent and Trademark Office*